United States Patent
Holtby (10) Patent No.: US 11,608,671 B2
(45) Date of Patent: *Mar. 21, 2023

(54) CROSS-LINKED POLYETHYLENE FOAM INSULATION FOR WINDOW AND DOOR FRAMES

(71) Applicant: Katch Kan Holdings Ltd., Edmonton (CA)

(72) Inventor: Quinn A. J. Holtby, Edmonton (CA)

(73) Assignee: Katch Kan Holdings Ltd., Edmonton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/497,614

(22) Filed: Oct. 8, 2021

(65) Prior Publication Data
US 2022/0034149 A1 Feb. 3, 2022

Related U.S. Application Data

(63) Continuation of application No. 16/528,413, filed on Jul. 31, 2019, now Pat. No. 11,162,295.

(30) Foreign Application Priority Data

Mar. 26, 2019 (CA) .................. 3038110

(51) Int. Cl.
*E06B 3/263* (2006.01)
(52) U.S. Cl.
CPC .. *E06B 3/2632* (2013.01); *E06B 2003/26378* (2013.01)

(58) Field of Classification Search
CPC ...... E06B 3/2632; E06B 3/2675; E06B 3/307; E06B 3/305; E06B 3/302; E06B 2003/26378
See application file for complete search history.

(56) References Cited

U.S. PATENT DOCUMENTS

| | | |
|---|---|---|
| 5,363,628 A | 11/1994 | Basar et al. |
| 6,604,323 B1 | 8/2003 | Joo |
| 9,598,892 B2 | 3/2017 | Header et al. |
| 10,267,082 B2 | 4/2019 | Knapp |
| 2002/0184841 A1 | 12/2002 | Diamond |
| 2004/0213925 A1 | 10/2004 | Xiong |

(Continued)

FOREIGN PATENT DOCUMENTS

| | | |
|---|---|---|
| DE | 4221070 | 12/1993 |
| DE | 19716556 | 10/1998 |

(Continued)

OTHER PUBLICATIONS

"Cross Linked Polyethylene—2LB", Foam Factory, Retrieved at: https://canada.foambymail.com/XPE2/cross-linked-polyethylene-foam-2lb.html on Jan. 3, 2018, 3 pages.

(Continued)

*Primary Examiner* — Christine T Cajilig
(74) *Attorney, Agent, or Firm* — Colby Nipper PLLC (57) ABSTRACT

There is a frame insulator that covers a window or door frame. A door or window has one or more panels that are supported by frame members. The frame members have interior surfaces and exterior surfaces. The one or more panels are mounted on the frame members. The interior surfaces or the exterior surfaces or both are enclosed by sheets of cross-linked polyethylene foam extending adjacent to the one or more panels and forming frame insulators.

20 Claims, 6 Drawing Sheets

(56) References Cited

U.S. PATENT DOCUMENTS

| | | |
|---|---|---|
| 2016/0208547 A1 | 7/2016 | Champlin |
| 2017/0101772 A1 | 4/2017 | Olson et al. |
| 2020/0284086 A1 | 9/2020 | Volpe |
| 2020/0308898 A1 | 10/2020 | Holtby |

FOREIGN PATENT DOCUMENTS

| | | |
|---|---|---|
| FR | 2823286 | 6/2004 |
| GB | 1325183 | 8/1973 |
| GB | 1603092 | 11/1981 |
| GB | 2077333 | 12/1981 |
| WO | 2014127770 | 8/2014 |

OTHER PUBLICATIONS

"Final Office Action", U.S. Appl. No. 16/528,413, dated Jun. 29, 2020, 11 Pages.

"Final Office Action", U.S. Appl. No. 16/528,413, dated Oct. 29, 2020, 13 pages.

"Google Images search results for Window Frame Seal [on-line]", Retrieved from the Internet on Mar. 21, 2018, 123 pages.

"Material Safety Data Sheet", Palziv North America, 7966 NC 56 Hwy, Louisburg, NC 27549, May 1, 2010, 4 pages.

"Non-Final Office Action", U.S. Appl. No. 16/528,413, dated Feb. 16, 2021, 13 pages.

"Non-Final Office Action", U.S. Appl. No. 16/528,413, dated Mar. 6, 2020, 11 Pages.

"Notice of Allowance", U.S. Appl. No. 16/528,413, dated Jul. 13, 2021, 7 pages.

CROSS-LINKED POLYETHYLENE FOAM INSULATION FOR WINDOW AND DOOR FRAMES

PRIORITY/CROSS-REFERENCE TO RELATED APPLICATIONS

The present application is a continuation of and claims the benefit of pending application Ser. No. 16/528,413, filed Jul. 31, 2019, the entire disclosure of which is hereby incorporated by reference.

TECHNICAL FIELD

Insulation for window and door frames.

BACKGROUND

Window and door frames are often a source of heat transfer through the window or door. In the winter, heat may escape an interior space through the frames. In the summer, heat may enter the interior space. Aluminum frames may be particularly prone to either heat loss or gain. There are drawbacks at current attempts to insulate window or door frames to reduce heat transfer. For example, rubber weather stripping can damage paint or leave a sticky residue when they are removed. Weather stripping can also be difficult to install. Other custom-made insulation techniques can be expensive or time consuming to install. For example, painting over the frame may have only nominal insulating effects.

SUMMARY

In an embodiment there is a window or door having one or more panels supported by frame members, the frame members have interior surfaces and exterior surfaces, the one or more panels are mounted on the frame members, the interior surfaces or the exterior surfaces or both are enclosed by sheets of cross-linked polyethylene foam extending adjacent to the one or more panels and forming frame insulators.

In various embodiments, there may be included any one or more of the following features: frame insulators include co-planar surfaces meeting at junctions, and the sheets of cross-linked polyethylene foam have matching tapers at the junctions, matching tapers comprising mitre joints, the frame insulators including surfaces meeting at right angles and sheets of the cross-linked polyethylene foam that line the surfaces that meet at right angles forming butt joints, the frame members being formed of one of wood, metal and plastic, the cross-linked polyethylene foam having a density between 25 and 200 kg/m$^3$, the one or more panels are multiple transparent panes, and the frame members include at least one member between two transparent panes of the multiple transparent panes, the cross-linked polyethylene foam enclosing the at least one member extending between the two transparent panes, the cross-linked polyethylene foam further comprises a U-shape and is flush with the at least one member, the U-shape comprises multiple sheets of cross-linked polyethylene foam glued together, the frame members including outer frame members adjacent to a structure in which the window is placed, the cross-linked polyethylene foam covering the outer frame members extending between the structure and the one or more transparent panes, the cross-linked polyethylene foam further comprises an L-shape and is flush with the outer frame members, the L-shape comprises two sheets of cross-linked polyethylene foam glued together, and all the exterior surfaces on the frame of the window or door are covered by sheets of cross-linked polyethylene foam, a window in which one or more panels are one or more window panes mounted between the exterior surfaces and interior surfaces, and a door in which the one or more panels is a door panel.

These and other aspects of the device and method are set out in the claims.

BRIEF DESCRIPTION OF THE FIGURES

Embodiments will now be described with reference to the figures, in which like reference characters denote like elements, by way of example, and in which.

DETAILED DESCRIPTION

Figure 1A:
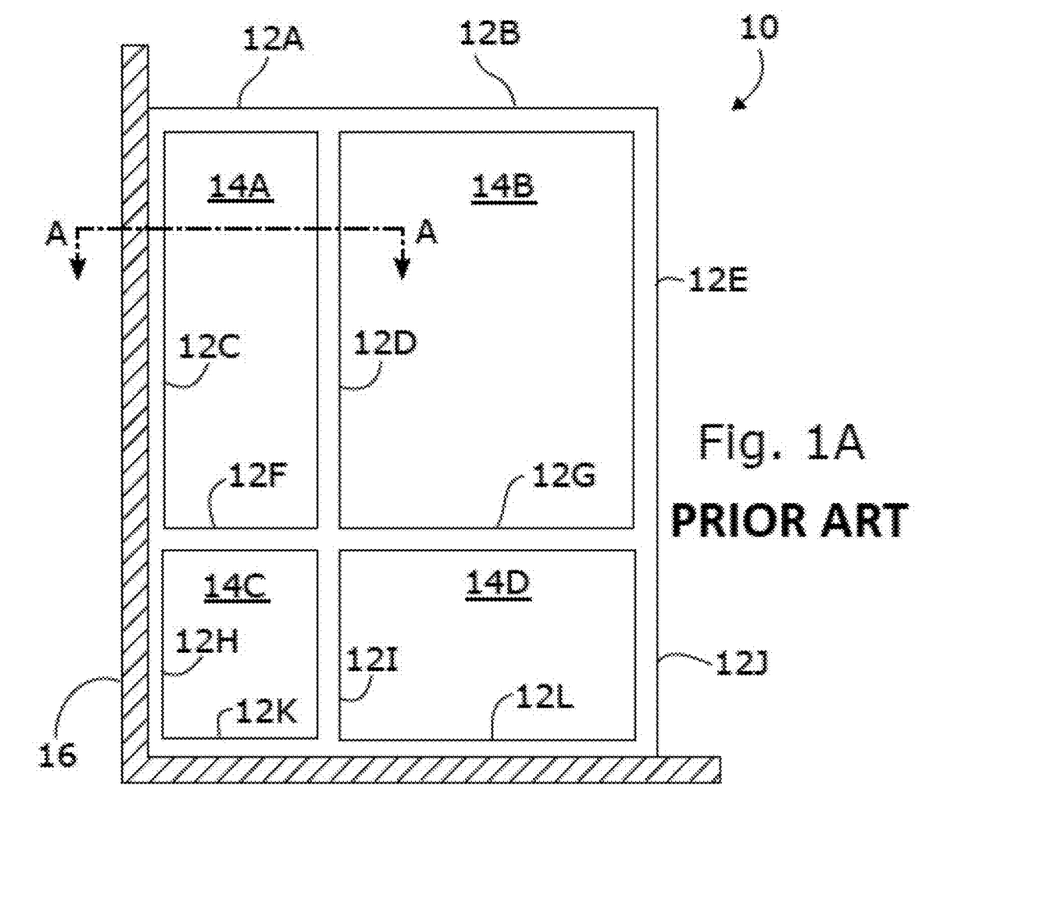
FIG. 1A is a side view of a prior art window frame.

FIG. 1A is a front view of a prior art window 10. The window comprises frame members 12A-12L. The frame members may be formed of any suitable material such as wood, metal or plastic. In an example, the frame members are formed of aluminum. The window frame including multiple members may be formed as a single piece, or frame members may be formed of multiple pieces. Regardless of the precise construction, for the purpose of this document a frame member is considered to be a portion of the frame between two intersections or corners of the frame.

Between the frame members are panels, which in this embodiment are transparent window panes 14A, 14B, 14C and 14D. The frame members 12A to 12L have interior surfaces 20 and exterior surfaces 22 as shown in FIG. 1B.

A structure 16 in which the window 10 is placed is shown adjacent to left and bottom sides of the window of FIG. 1A, the left side of the window comprising frame members 12C and 12H and the bottom side of the window comprising frame members 12K and 12L. One example of the structure 16 in which the window could be placed, as shown in FIG. 1A, is a wall. Another example is a door. The wall 16 could also be present at the top and right sides of the window, or the window could continue further to the top or right. A window may be composed of one or more transparent frames.

Figure 1B:
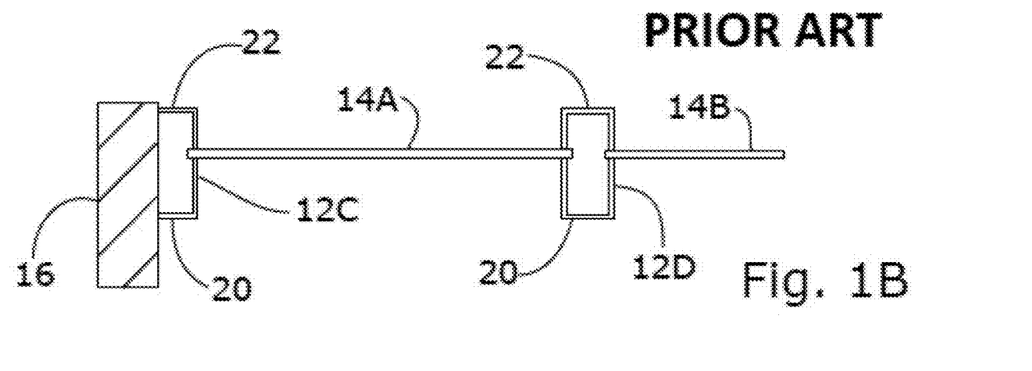
FIG. 1B is cross section of the window frame in FIG. 1A through the line A-A.

FIG. 1B is a top view of a cross section of the left side of the window of FIG. 1A. This shows the relation between the frame members and window panes more clearly. The window shown is single glazed but everything described in this document also applies to double or triple, etc., glazed windows. The frame members shown here are hollow aluminum frame members but everything in this document also applies to solid frame members and to frame members of different materials.

Figure 2:
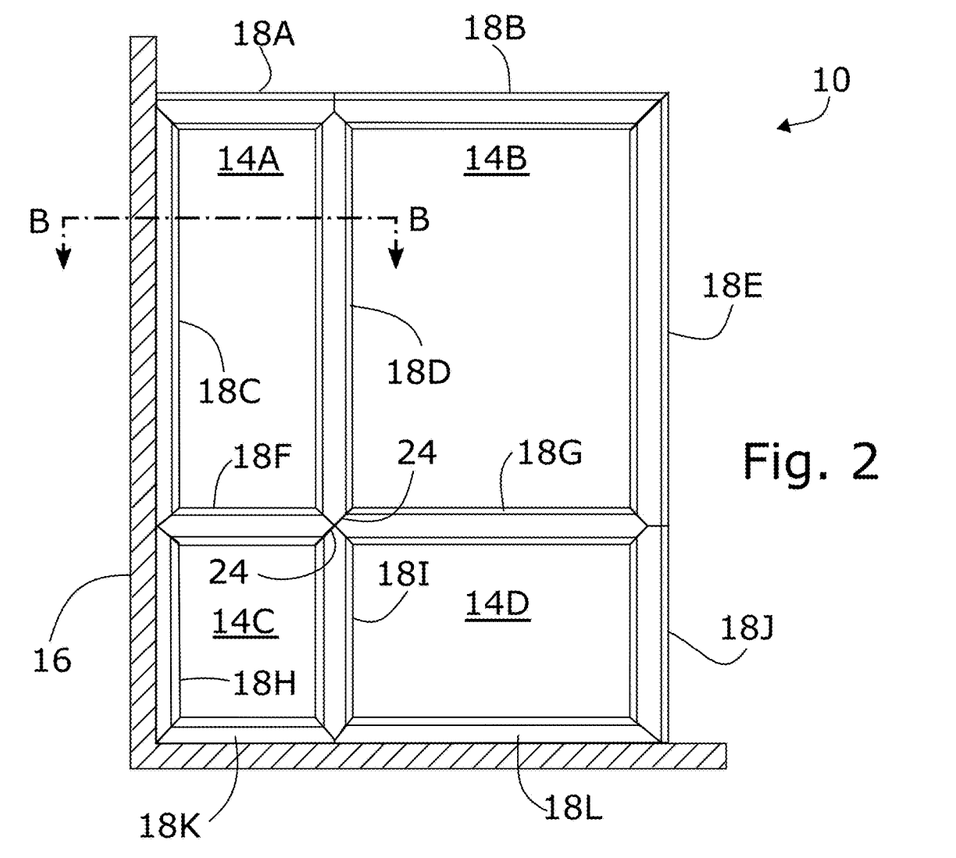
FIG. 2 is a side view of a window frame with sheets of cross-linked polyethylene foam covering the frame.
Figure 3:
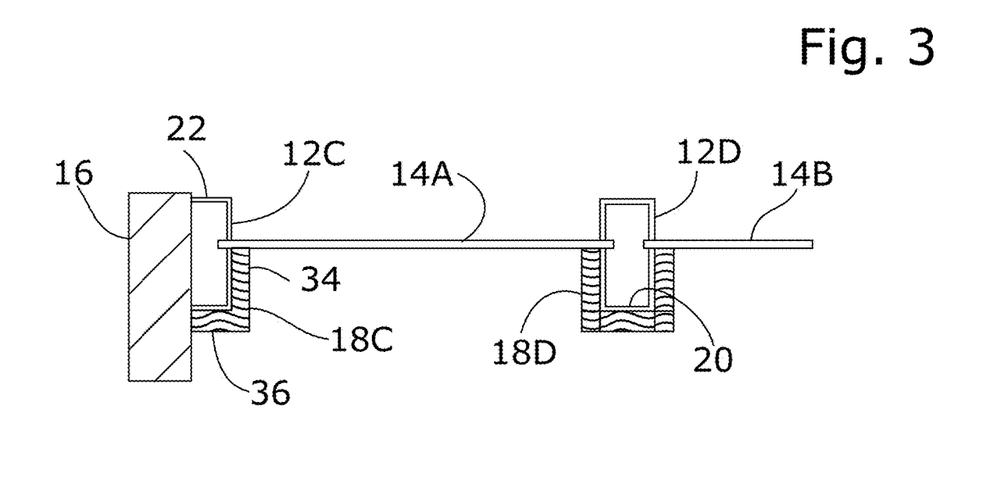
FIG. 3 is a cross-section of the window frame in FIG. 2 through the line B-B.

FIGS. 2 and 3 show the window 10 insulated with sheets of cross-linked polyethylene foam. The window has four transparent panes 14A to 14D supported by frame members 12A to 12L (FIG. 1A). The panes 14A to 14D are mounted between the exterior surfaces 22 and interior surfaces 20 (FIG. 3) of the frame members. As shown in FIG. 3, the interior surfaces 20 are enclosed by sheets of cross-linked polyethylene foam extending adjacent to the transparent panes 14A to 14D and forming frame insulators 18A to 18L. The exterior surfaces of the frames may alternatively, or additionally, be enclosed by sheets of cross-linked polyethylene foam in the same manner.

Figure 4:
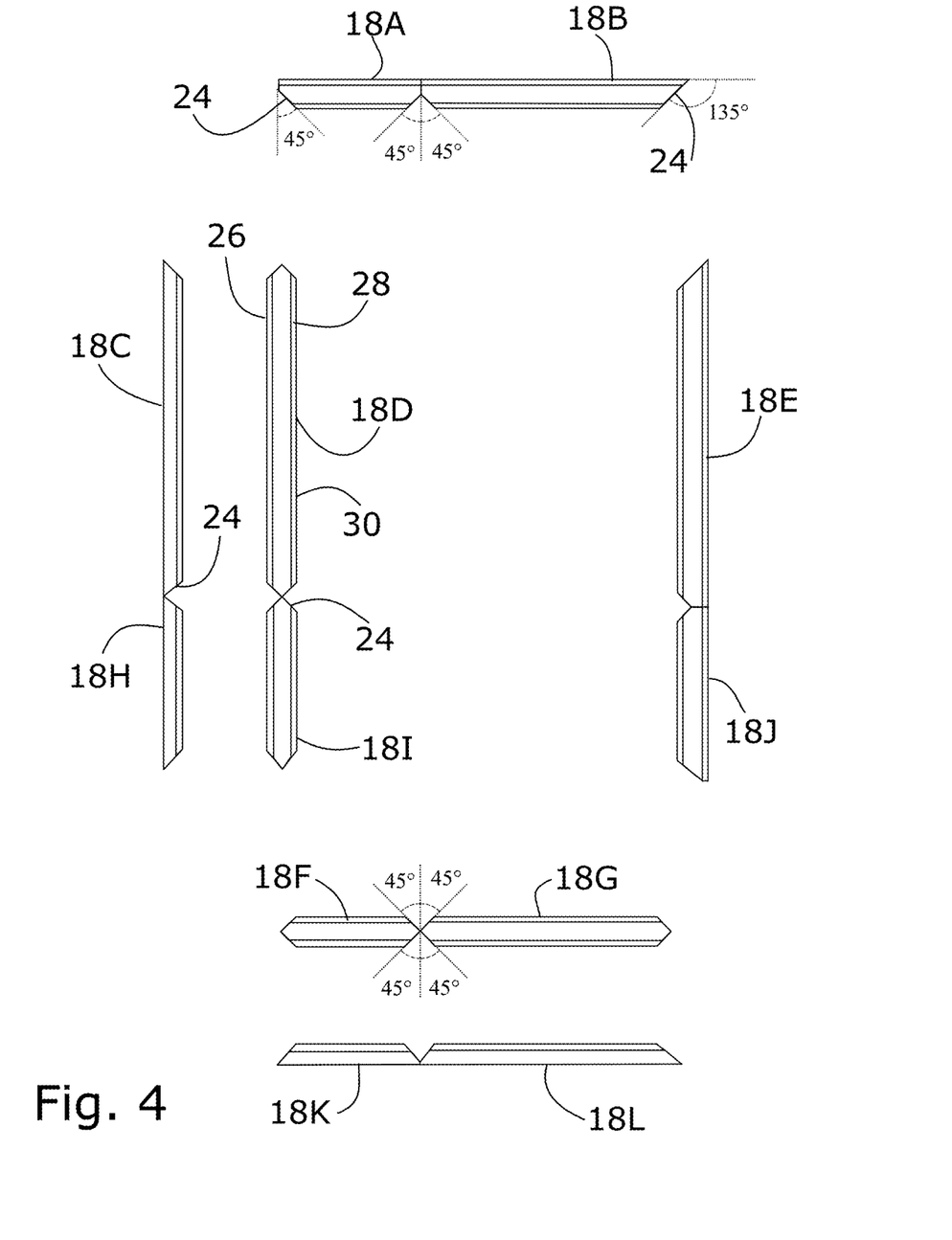
FIG. 4 is a top view of a collection of sheets of cross-linked polyethylene foam.

The frame insulators 18A to 18L include co-planar surfaces meeting at junctions as shown for example where frame insulators 18D, 18F, 18G, and 18I meet as shown in FIG. 2, and the sheets of cross-linked polyethylene foam have matching tapers 24 at the junctions. The tapers 24 as shown in FIGS. 2 and 4 are at 45 degrees and form mitre joints. However, it will be understood that different taper angle can be used as long as the adjacent tapers are flush with each other. The tapers need not be formed using straight lines. By having flush tapered surfaces, gaps between the cross-linked polyethylene foam sheets are eliminated, which assists in reducing heat transfer through the window frames.

As shown in FIG. 2, the frame members include frame members that extend between two transparent panes of multiple transparent panes, for example, frame 12D (FIG. 1A). The frame insulator 18D encloses and insulates the frame 12D between the two transparent panes 14A and 14B. In this case, the frame insulator 18D further comprises a U-shape and is flush with the frame member 12D. The U-shape comprises multiple sheets 26, 28, 30 (FIG. 5) of cross-linked polyethylene foam glued together.

Figure 5:
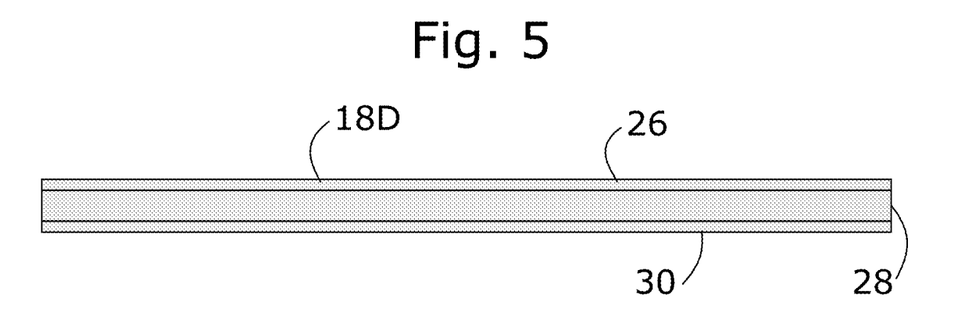
FIG. 5 is a top view of sheets of cross-linked polyethylene foam forming a frame insulator.
Figure 6:
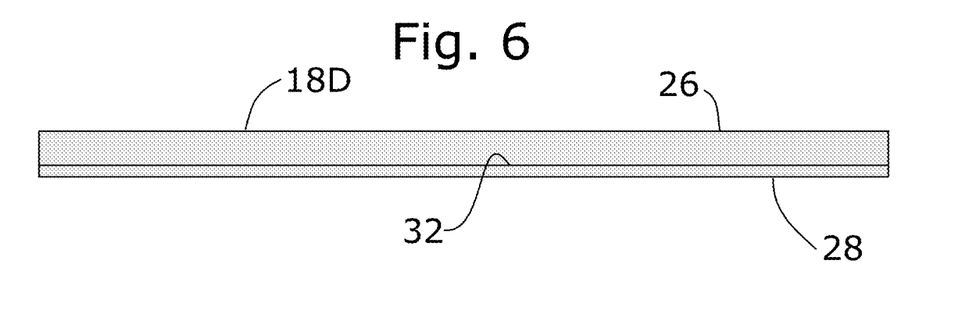
FIG. 6 is a side view of the sheets of cross-linked polyethylene foam of FIG. 5.
Figure 7:
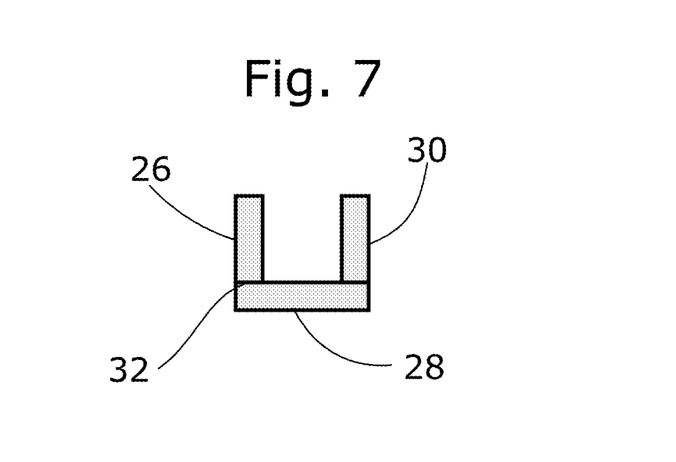
FIG. 7 is an end view of the sheets of cross-linked polyethylene foam of FIG. 5.

As shown in FIGS. 5-7, the frame insulator 18D includes sheets 26, 28 and 30 meeting at right angles. The sheets 26, 28 and 30 of the cross-linked polyethylene foam that line the surfaces that meet at right angles form butt joints 32. Frame insulator 18D is used as an example frame insulator made from three sheets of foam, which is shown in more detail in FIG. 5. Similarly, each of the frame insulators 18A, 18B, 18D, 18E, 18F, 18G, 18I and 18J may also be formed from three sheets such as 26, 28 and 30 (FIG. 3) that meet at right angles and form butt joints 32. The joints may be glued together. The frame insulators may also be formed from more than three sheets if the frame has different shapes. The frame insulator may be constructed or assembled to have many different shapes depending on the shape of the frame to which it is mounted.

As shown in FIG. 3, frame insulator 18C covers outer frame members adjacent to the structure 16 in which the window is placed. Frame insulators 18H, 18K and 18L are placed in a similar manner and have a similar structure to frame insulator 18C and are also made from two sheets joined together. The frame insulators covering the outer frame members extend between the structure 16 and the one or more transparent panes. The frame insulators 18C, 18H, 18K and 18L form an L-shape and are flush with the outer frame members and lie adjacent to the structure 16. Frame insulators 18C, 18H, 18K and 18L may be formed from two surfaces 34, 36 (FIG. 3) that meet at right angles that form a butt joint. Although only frame insulator 18C is shown in FIG. 3, the other frame insulators 18H, 18K and 18L may be formed in the same manner. The two sheets of cross-linked polyethylene foam may be glued together to form the butt joint.

As shown in FIG. 2, all of the interior surfaces on the frame of the window are covered by sheets of cross-linked polyethylene foam. Similarly, all of the exterior surfaces of the frame of the window may be covered by sheets of cross-linked polyethylene foam in the same manner.

Figure 8:
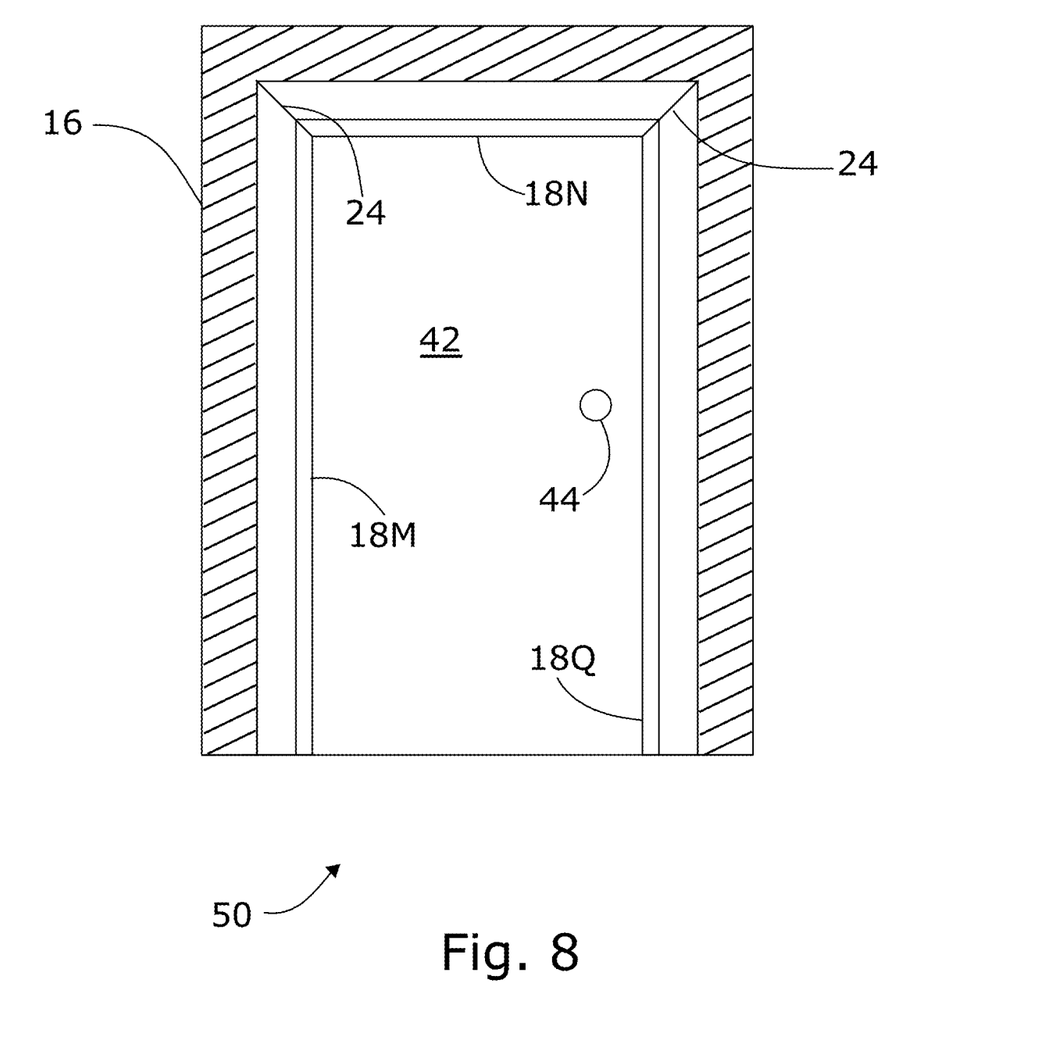
FIG. 8 is a side view of a door frame with sheets of cross-linked polyethylene foam covering the frame.
Figure 9:
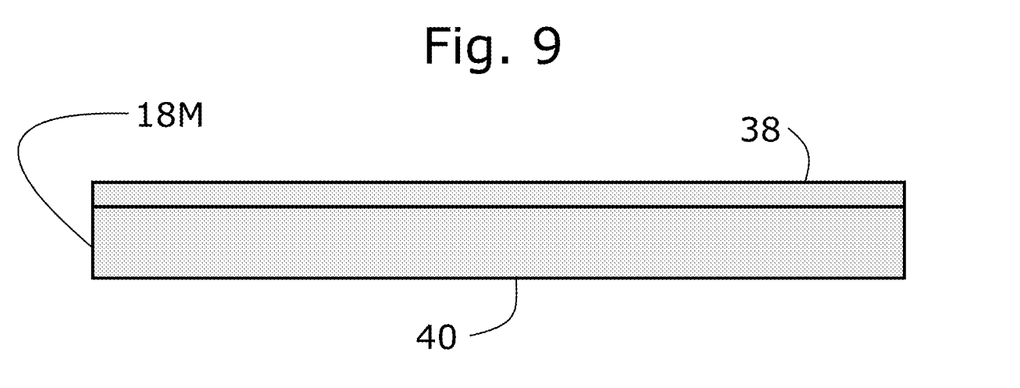
FIG. 9 is a top view of a pair of sheets of cross-linked polyethylene foam.
Figure 10:
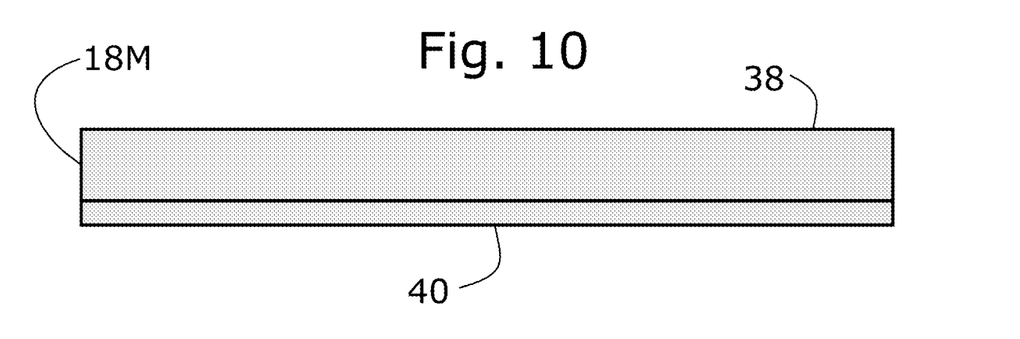
FIG. 10 is a side view of the sheets of cross-linked polyethylene foam of FIG. 9.
Figure 11:
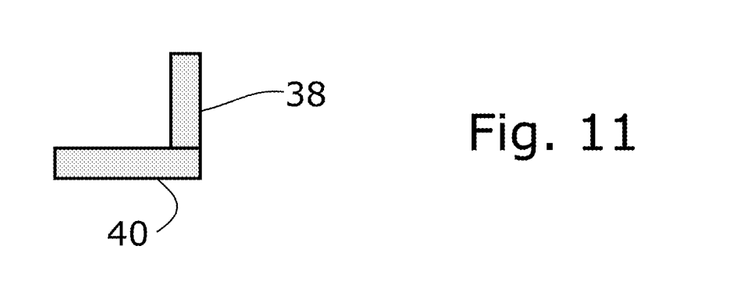
FIG. 11 is an end view of the sheets of cross-linked polyethylene foam of FIG. 9.

FIGS. 8-11 show an embodiment in which frame insulators 18M, 18N and 18Q are placed on a door frame 50. There is a panel 42, which in this embodiment is a door panel with a door handle 44. The principles of application of the frame insulators is similar to those in the embodiments shown in FIGS. 2-7. The door frame 50 as shown in FIG. 8 is adjacent to structure 16, such as a wall. The frame insulators 18M, 18N and 18Q are placed over frame members (not shown) of the door frame. The door may open inwardly or outwardly and the frame insulators are placed in a manner that they do not interfere with the door opening or closing. The frame insulators 18M, 18N, and 18Q are tapered where they meet at tapers 24 and form mitre joints. As shown in FIGS. 9-11, the frame insulator 18M is made from two sheets 38 and 40 of cross-linked polyethylene foam that may be glued together to form the butt joints in a similar manner to frame insulator 18C as shown in FIG. 3. The frame insulators 18N and 18Q may be formed in the same manner as frame insulator 18M.

In the embodiments described herein, the cross-linked polyethylene foam may be used as insulation to cover the interior surfaces or exterior surfaces of a window or door frame where there is a temperature difference between opposite sides of the window or door. For example, the interior surfaces may be inside of a structure and the exterior surface may be outside of a structure. For example, in winter, it may be beneficial to have cross-linked polyethylene foam on one of, or both of, the interior and exterior surfaces of the frame in order to retain heat. In the summer, it may be beneficial for the frames to be covered in order to keep heat out of a cooler interior. The cross-linked polyethylene foam may provide an insulative benefit on any windows or doors where there is a temperature difference on opposite sides. Although the terms interior and exterior surfaces are used, the terms are used for ease of reference to denote opposite ends of the window or door. It is not necessary for one side of the window or door to be inside and the other side to be outside.

Preferably, the frame insulators will be flush with the frame by having matching shaped surfaces, but open spaces between the frame and frame insulators may also be present. The frame insulators may be pressed fit into place on the window frame. Glue or other securing technique may be alternatively or additionally be used to hold the foam in place on the window frame. The foam may form a seal around the window frame. By forming a seal, the cross-linked polyethylene foam may be less likely to leak than alternative insulating techniques. The foam is also safe and stable, as well as impact absorbing. There is no need to paint over the frame once it has been sealed with foam. Different colours of foam may be selected depending on the desired aesthetic.

The foam may also be custom-designed to fit the shape of the frame. Various different numbers of connected pieces of cross-linked polyethylene foam can be used. The sheets of foam may be connected to each other by other means other than glue. In some embodiments, a spray adhesive, such as Super 77™, may be used to glue the sheets of cross-linked polyethylene foam together. The same glue may be used to attach the foam to the window frames. The cross-linked polyethylene foam may assist in preventing moisture from entering the frame. The frame insulators in some embodiments may be custom designed to have a particular shape. For example, the frame insulators may be made from a single custom-designed sheet of cross-linked polyethylene foam which is designed to match the shape of the frame.

The cross-linked polyethylene foam may be foam such as is supplied by Palziv North America. In a preferred embodiment, the cross-linked polyethylene foam may have the following composition:

| Substance (Abbreviation) | Substance (Chemical name) | Cas # | PHR |
|---|---|---|---|
| LDPE | Polyethylene | 9002-88-4 | 100 |
| DCP | Dicumyl Peroxide | 80-43-3 | <1 |
| ADCA | Azodicarbonamide | 123-77-3 | <20 |
| MB | Organic Pigment | | <3 |

The cross-linked polyethylene foam sheets may have a density between 25 and 200 kg/m$^3$. In a preferred embodiment, the foam sheets may have a density of approximately 64.07 kg/m$^3$. In other embodiments, the density of the foam sheets may be within 10% or 20% of 64.07 kg/m$^3$.

Immaterial modifications may be made to the embodiments described here without departing from what is covered by the claims.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The invention claimed is:

1. A window or door having one or more panels supported by frame members, the frame members having interior surfaces and exterior surfaces, the one or more panels being mounted on the frame members, the interior surfaces or the exterior surfaces or both being enclosed by pre-fabricated sheets of cross-linked polyethylene foam extending adjacent to the one or more panels and forming frame insulators,
   wherein the pre-fabricated sheets of cross-linked polyethylene foam have a density between 25 and 200 kg/m$^3$, and
   wherein the pre-fabricated sheets of cross-linked polyethylene foam are custom designed to match the shape of the frame members.

2. The window or door of claim 1 in which the frame insulators include co-planar surfaces meeting at junctions, and the sheets of cross-linked polyethylene foam have matching tapers at the junctions.

3. The window or door of claim 2 in which the matching tapers comprise mitre joints.

4. The window or door of claim 1 in which the frame insulators include surfaces meeting at right angles and sheets of the cross-linked polyethylene foam that line the surfaces that meet at right angles form butt joints.

5. The window or door of claim 1 in which the frame members are formed of wood.

6. The window or door of claim 1 in which the frame members are formed of metal.

7. The window or door of claim 1 in which the frame members are formed of plastic.

8. The window or door of claim 1 in which the density of the pre-fabricated sheets of cross-linked polyethylene foam is within 10% of 64.07 kg/m$^3$.

9. The window or door of claim 1 further comprising a window, and in which one or more panels are one or more window panes mounted between the exterior surfaces and interior surfaces.

10. The window of claim 9 in which the one or more window panes are multiple transparent panes, and the frame members include at least one member between two transparent panes of the multiple transparent panes, the cross-linked polyethylene foam enclosing the at least one member extending between the two transparent panes.

11. The window of claim 10 in which the cross-linked polyethylene foam further comprises a U-shape and is flush with the at least one member.

12. The window of claim 11 in which the U-shape comprises multiple sheets of cross-linked polyethylene foam glued together.

13. The window or door of claim 10 in which the frame members include outer frame members adjacent to a structure in which the door or window is placed, the cross-linked polyethylene foam covering the outer frame members extending between the structure and the one or more transparent panes.

14. The window or door of claim 13 in which the cross-linked polyethylene foam further comprises an L-shape and is flush with the outer frame members.

15. The window or door of claim 14 in which the L-shape comprises two sheets of cross-linked polyethylene foam glued together.

16. The window or door of claim 1 in which all the exterior surfaces on the frame members are covered by sheets of cross-linked polyethylene foam.

17. The window or door of claim 1 in which the window or door further comprises a door and the one or more panels further comprises a door panel.

18. The window or door of claim 1 in which the density of the pre-fabricated sheets of cross-linked polyethylene foam is within 20% of 64.07 kg/m$^3$.

19. A window or door having one or more panels supported by frame members, the frame members having interior surfaces and exterior surfaces, the one or more panels being mounted on the frame members, the interior surfaces or the exterior surfaces or both being enclosed by pre-fabricated sheets of cross-linked polyethylene foam extending adjacent to the one or more panels and forming frame insulators,
   wherein the frame insulators include co-planar surfaces meeting at junctions,
   wherein the frame insulators include surfaces meeting at right angles and sheets of the cross-linked polyethylene foam that line the surfaces that meet at right angles form butt joints,
   wherein the sheets of cross-linked polyethylene foam have matching tapers at the junctions,
   wherein the pre-fabricated sheets of cross-linked polyethylene foam have a density between 25 and 200 kg/m$^3$, and
   wherein the pre-fabricated sheets of cross-linked polyethylene foam are custom designed to match the shape of the frame members.

20. A window or door having one or more panels supported by frame members, the frame members having interior surfaces and exterior surfaces, the one or more panels being mounted on the frame members, the interior surfaces or the exterior surfaces or both being enclosed by pre-fabricated sheets of cross-linked polyethylene foam extending adjacent to the one or more panels and forming frame insulators,
further comprising a window,
wherein the one or more panels are one or more window panes mounted between the exterior surfaces and interior surfaces,
wherein the one or more window panes are multiple transparent panes,
wherein the frame members include outer frame members adjacent to a structure which the door or window is placed,
wherein the frame members include at least one member between two transparent panes of the multiple transparent panes,
wherein the cross-linked polyethylene foam covers the outer frame members extending between the structure and the one or more transparent panes of the multiple transparent panes,
wherein the cross-linked polyethylene foam encloses the at least one member extending between the two transparent panes,
wherein the pre-fabricated sheets of cross-linked polyethylene foam have a density between 25 and 200 kg/m$^3$, and
wherein the pre-fabricated sheets of cross-linked polyethylene foam are custom designed to match the shape of the frame members.

\* \* \* \* \*